(12) United States Patent
Morita et al.

(10) Patent No.: US 9,369,611 B2
(45) Date of Patent: Jun. 14, 2016

(54) IMAGE READING APPARATUS WITH ADJUSTABLE READ TIMING

(71) Applicant: BROTHER KOGYO KABUSHIKI KAISHA, Nagoya-shi, Aichi-ken (JP)

(72) Inventors: Kyoichi Morita, Anjo (JP); Isao Kubo, Tokoname (JP); Hidenobu Kondo, Nagoya (JP); Takahiro Ikeno, Seto (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/621,032

(22) Filed: Feb. 12, 2015

(65) Prior Publication Data

US 2015/0229811 A1     Aug. 13, 2015

(30) Foreign Application Priority Data

Feb. 13, 2014   (JP) .................................. 2014-025176

(51) Int. Cl.
| | |
|---|---|
| *H04N 1/053* | (2006.01) |
| *H04N 1/60* | (2006.01) |
| *H04N 1/48* | (2006.01) |
| *H04N 1/10* | (2006.01) |

(Continued)

(52) U.S. Cl.
CPC ........... *H04N 1/6077* (2013.01); *H04N 1/1017* (2013.01); *H04N 1/125* (2013.01); *H04N 1/4076* (2013.01); *H04N 1/484* (2013.01); *H04N 1/6033* (2013.01)

(58) Field of Classification Search
CPC ............ H04N 1/6077; H04N 1/00013; H04N 1/0306; H04N 1/0476; H04N 1/053; H04N 1/00588; H04N 1/00034; H04N 2201/0081
USPC ......... 358/1.9, 1.5, 2.1, 3.27, 1.12, 1.18, 496, 358/498
See application file for complete search history.

(56) References Cited

U.S. PATENT DOCUMENTS 5,721,423 A * 2/1998 Hamamoto .............. H04N 1/17
250/208.1
2007/0195379 A1   8/2007 Suga
(Continued)

FOREIGN PATENT DOCUMENTS

| JP | 4201008 A | 12/2008 |
|---|---|---|
| JP | 2009246636 A | 10/2009 |

(Continued)

OTHER PUBLICATIONS

U.S. Appl. No. 14/592,024, filed Jan. 8, 2015.
(Continued)

*Primary Examiner* — Jamares Q Washington
(74) *Attorney, Agent, or Firm* — Merchant & Gould P.C.

(57) ABSTRACT

An image reading apparatus includes: a reading unit having a plurality of photoelectric conversion elements arranged in a main scanning direction; a white reference plate arranged to face the reading unit; a motor configured to move at least one of an original and the reading unit relative to each other; and a controller configured to: control the reading unit to read the white reference plate to obtain white reference data; determine, based on a driving velocity of the motor, whether relative position between the original and the reading unit has changed by a predetermined distance; and output a displacement signal in a case of determining that the relative position between the original and the reading unit has changed by the predetermined distance.

5 Claims, 12 Drawing Sheets

(51) Int. Cl.
*H04N 1/12* (2006.01)
*H04N 1/407* (2006.01)

(56) References Cited

U.S. PATENT DOCUMENTS

| | | | |
|---|---|---|---|
| 2011/0102864 A1* | 5/2011 | Ishikawa | H04N 1/00649 358/498 |
| 2014/0218772 A1 | 8/2014 | Koshimizu | |
| 2015/0092254 A1 | 4/2015 | Sakakibara et al. | |
| 2015/0201102 A1 | 7/2015 | Morita et al. | |

FOREIGN PATENT DOCUMENTS

| | | |
|---|---|---|
| JP | 2011044783 A | 3/2011 |
| JP | 2011097467 A | 5/2011 |
| JP | 2012090204 A | 5/2012 |
| JP | 2012165227 A | 8/2012 |
| JP | 2013115579 A | 6/2013 |

OTHER PUBLICATIONS

U.S. Office Action (Notice of Allowance) issued in related U.S. Appl. No. 14/592,024, mailed Jun. 3, 2015.

\* cited by examiner

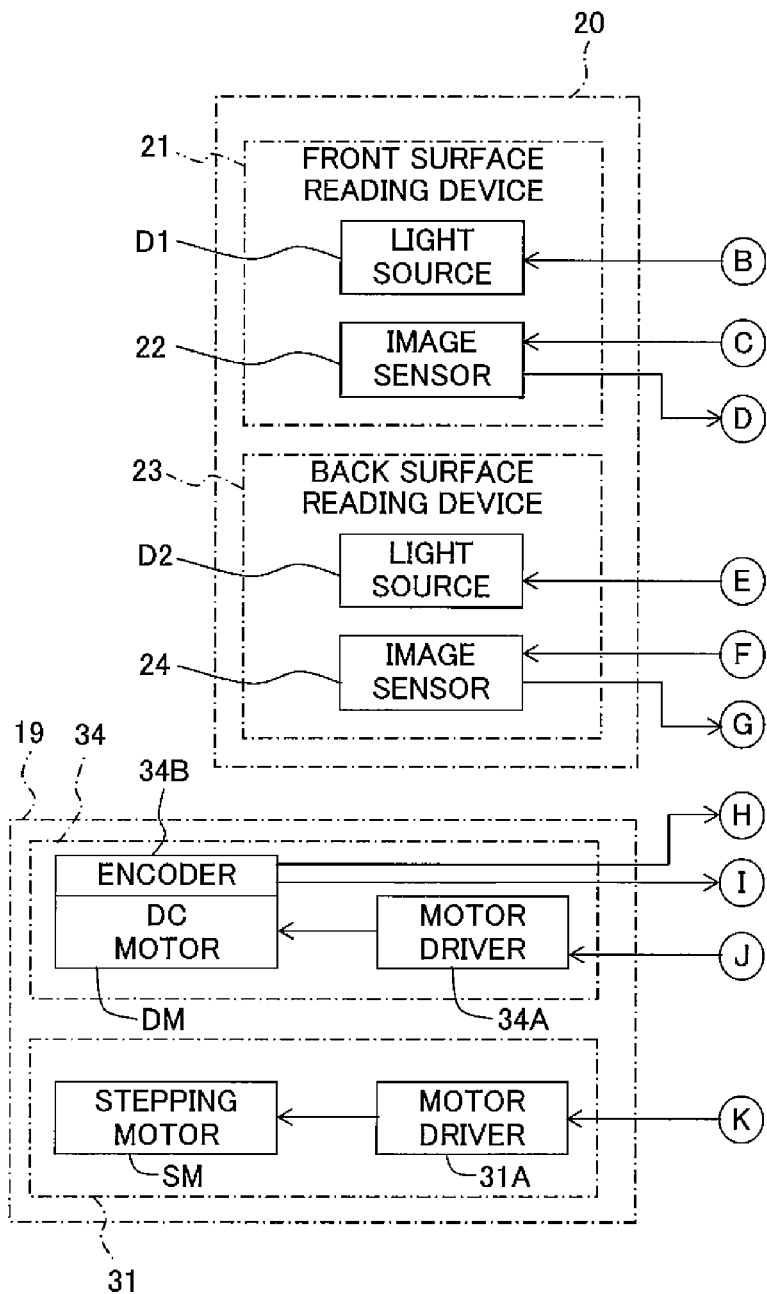

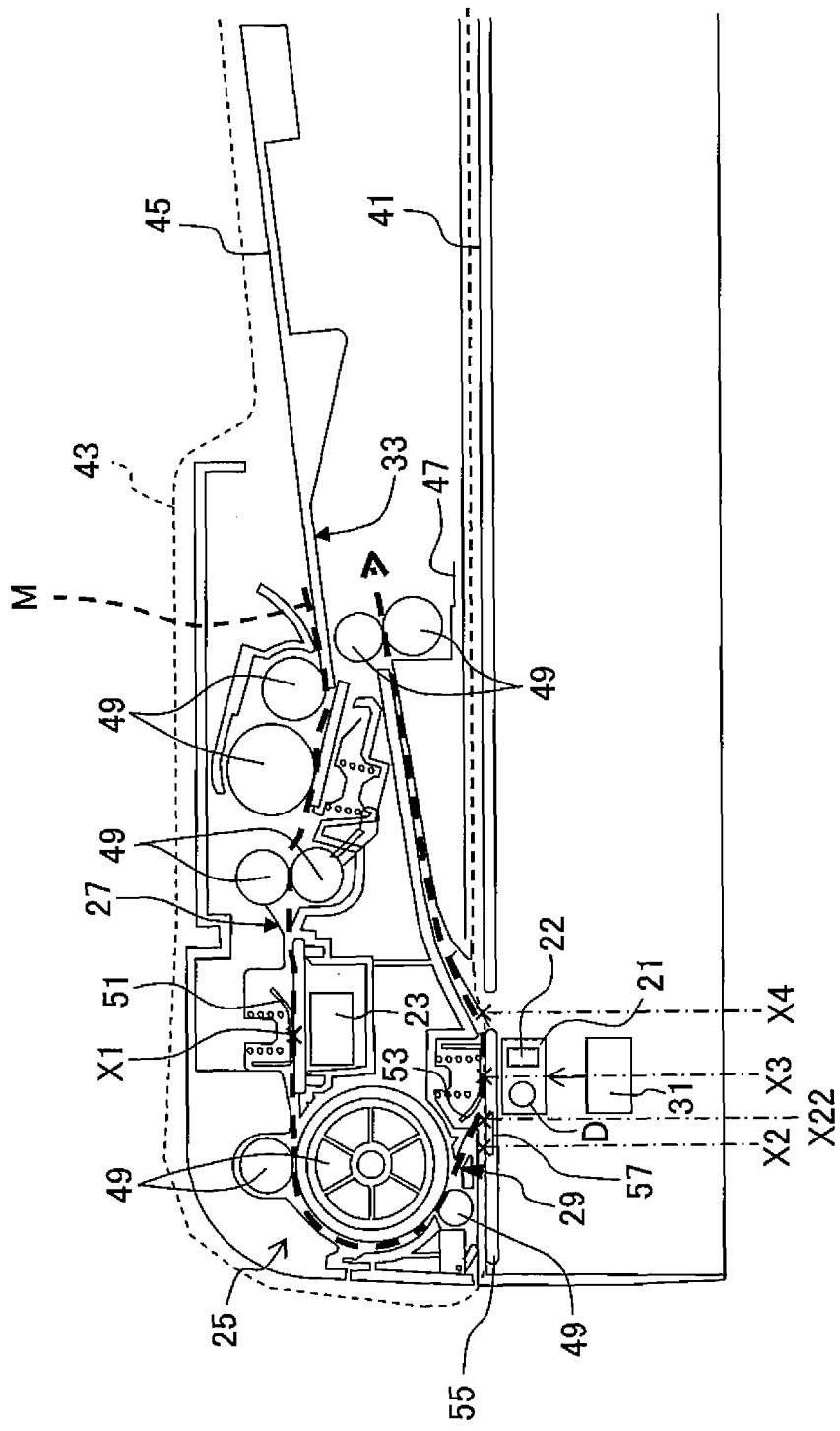

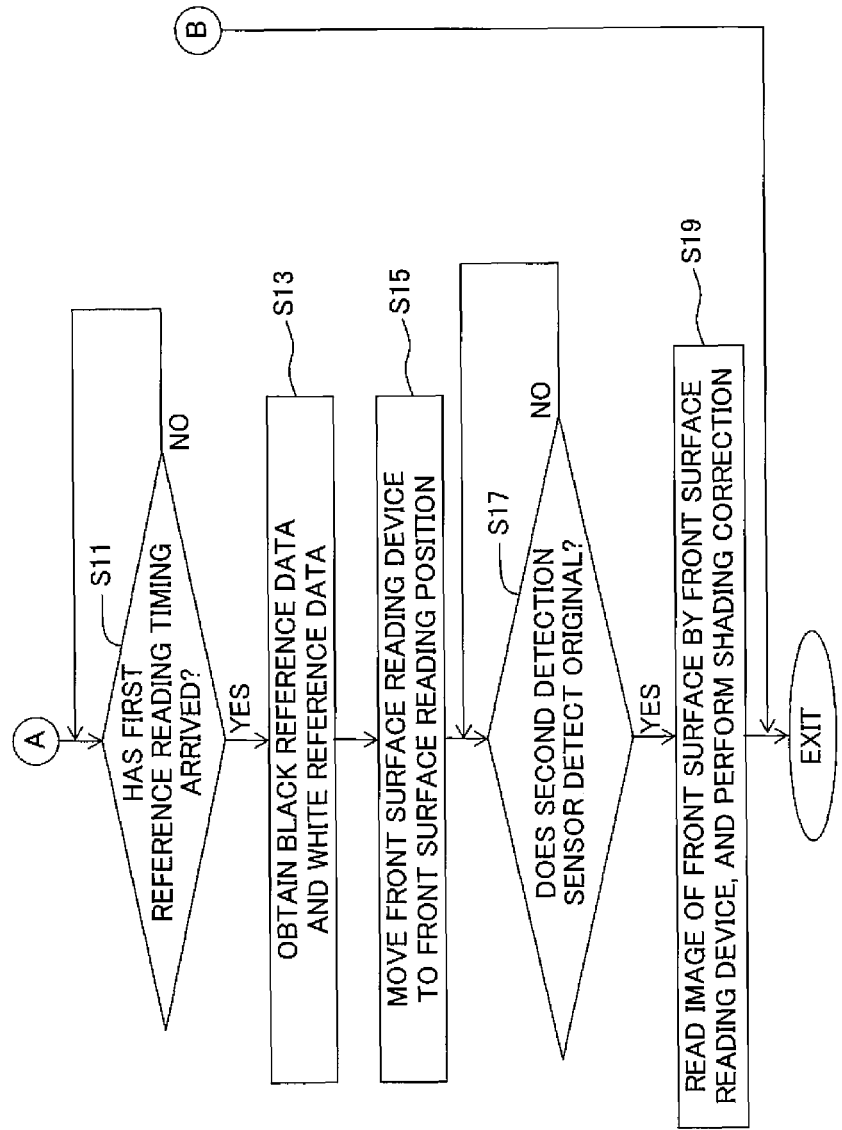

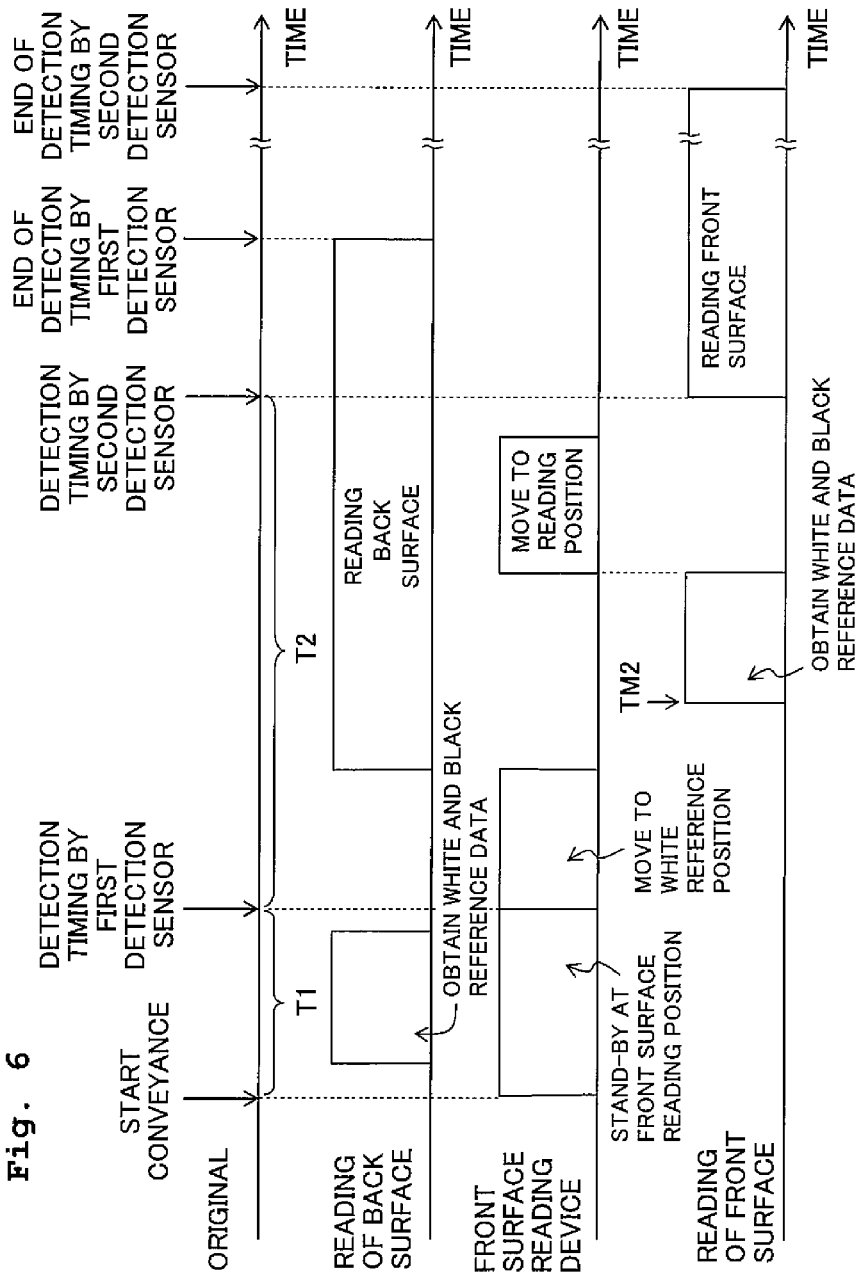

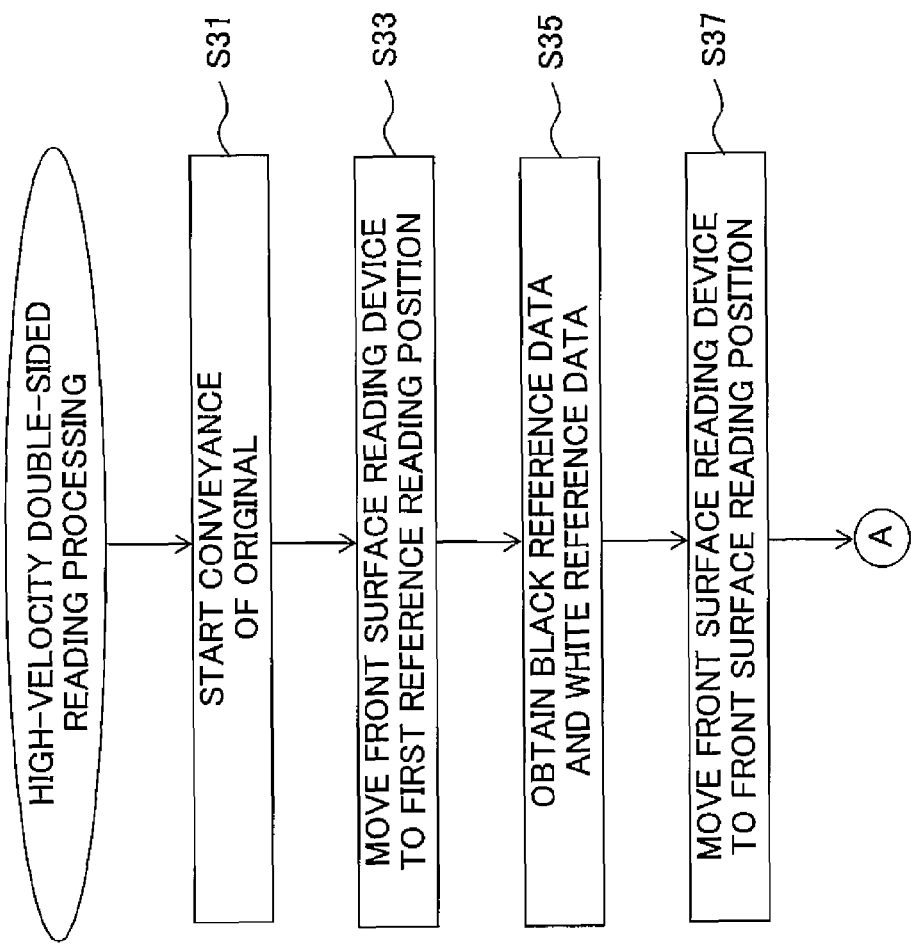

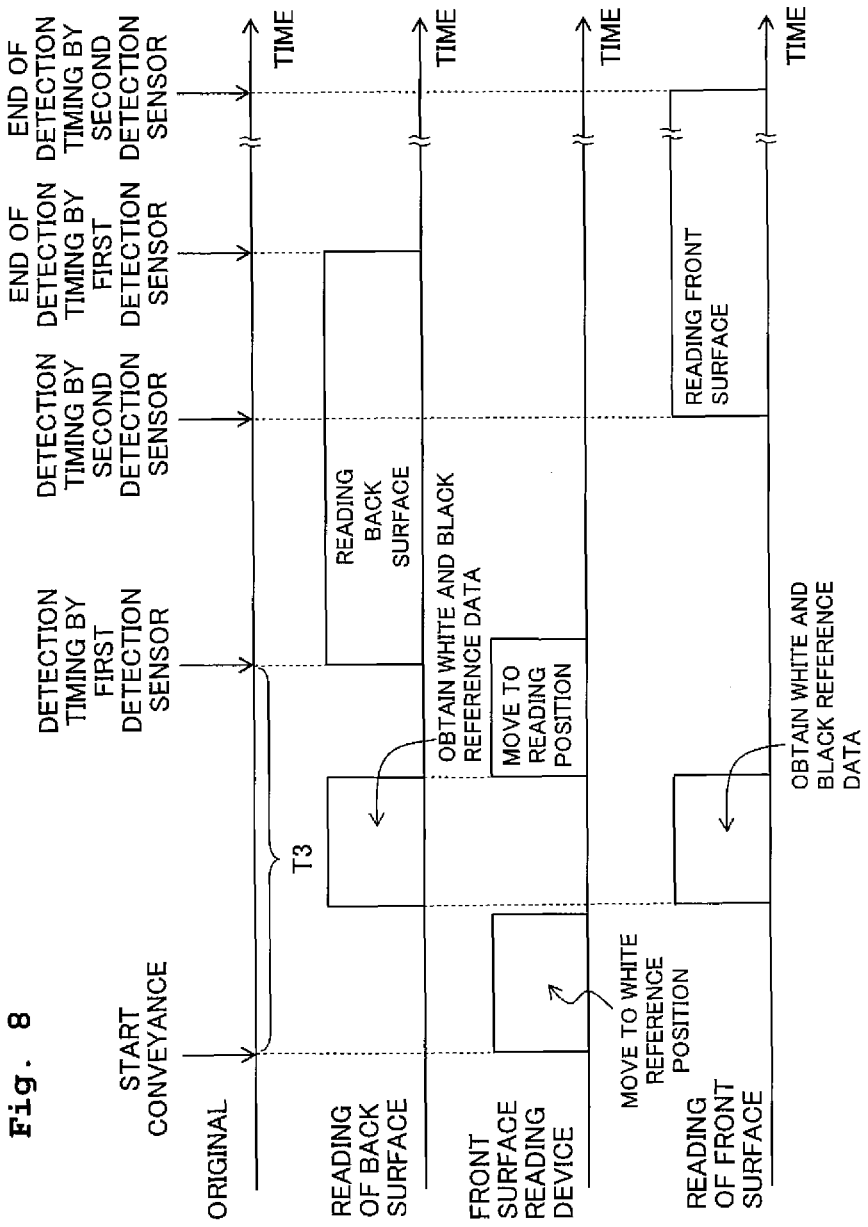

IMAGE READING APPARATUS WITH ADJUSTABLE READ TIMING

CROSS REFERENCE TO RELATED APPLICATION

The present application claims priority from Japanese Patent Application No. 2014-025176 filed on Feb. 13, 2014 the disclosure of which is incorporated herein by reference in its entirety.

BACKGROUND OF THE INVENTION

1. Field of the Invention

The present invention relates to an image reading apparatus.

2. Description of the Related Art

There is proposed a variety of conventional image reading apparatuses each of which executes a reading operation to read an image of an original by changing a relative position between a reading unit and the original. For example, there is proposed an image recording apparatus which generates a shift signal per a predetermined rotation amount of a motor changing the relative position between the reading unit and the original and which transfers electric charge, accumulated in a photoelectric conversion element of an image sensor, to a shift resistor in a synchronized manner with the shift signal (see, for example, Japanese Patent Application Laid-open No. 2011-44783). In this image recording apparatus, the reading operation for reading an image of the original is executed while being synchronized with the shift signal which is generated per a moving distance corresponding to one line.

SUMMARY

Generally, shading correction data such as white reference data, etc. is obtained by positioning a reading unit relative to a white reference plate and by detecting a reflected light from the white reference plate. In this case, for the purpose of obtaining normal shading correction data, the white reference plate needs to be read in a state close to the state when an ordinary (normal) reading operation for reading an original is executed. For example, in the image reading apparatus disclosed in Japanese Paten Application Laid-open No. 2011-44783, there is such a problem that any normal shading correction data cannot be obtained unless the reading operation for reading the white reference plate is executed while outputting a shift signal. Further, this image reading apparatus has another problem that in a case of executing an operation for conveying and reading the original, the shift signal is not outputted immediately before executing the reading operation unless the original is conveyed, and thus the shading correction data cannot be obtained. Furthermore, even when the original is conveyed, the operation of the motor is not stabilized immediately after the conveyance of original has been started, due to, for example, the load required for feeing paper sheet, the shape of conveyance path, etc., as compared with the operation of motor during the normal reading. Therefore, output of the shift signal is not stabilized. This causes the value of the shading correction data to be unstable, as a result.

An object of the present teaching is to provide a technique capable of obtaining the shading correction data in an image reading apparatus, without being affected by the variation or fluctuation in the conveyance velocity at which the original is conveyed.

According to an aspect of the present teaching, there is provided an image reading apparatus including: a reading unit having a plurality of photoelectric conversion elements arranged in a main scanning direction, each of the plurality of photoelectric conversion elements being configured to generate an electric signal in response to receiving light from an reading object; a white reference plate arranged to face the reading unit; a motor configured to move at least one of an original and the reading unit relative to each other, and a controller configured to: control the reading unit to read the white reference plate to obtain white reference data; determine, based on a driving velocity of the motor, whether relative position between the original and the reading unit has changed by a predetermined distance; and output a displacement signal in a case of determining that the relative position between the original and the reading unit has changed by the predetermined distance, wherein in a case of reading the image of the original by the reading unit, the controller is configured to: generate a first transfer timing signal which is synchronized with the displacement signal; and provide the first transfer timing signal to the reading unit such that a first electric signal generated by the plurality of photoelectric conversion elements is transferred in synchronization with the first transfer timing signal and the displacement signal, and in a case of obtaining the white reference data, the controller is configured to: generate a second transfer timing signal which is not synchronized with the displacement signal; and provide the second transfer timing signal to the reading unit such that a second electric signal generated by the photoelectric conversion elements is transferred in synchronization with the second transfer timing signal.

In the image reading apparatus, the first transfer timing signal is generated while being synchronized with the displacement signal when reading the image of the original, whereas the second transfer timing signal which is not synchronized with the displacement signal is generated when obtaining the white reference data. Accordingly, it is possible to obtain the shading correction data without being affected by any fluctuation in the conveyance velocity at which the original is conveyed.

Note that the present teaching can be realized by a variety of kinds of aspects including an image reading apparatus, an image reading method, a computer program for realizing the method or the function of the apparatus, a recording medium storing the computer program, etc.

BRIEF DESCRIPTION OF THE DRAWINGS

FIGS. 1A, 1B and 1C depict a block diagram depicting a multi-function peripheral according to an embodiment of the present teaching.

FIG. 2 is a cross-sectional view of the multi-function peripheral.

FIGS. 5A and 5B depict a flow chart depicting a high-resolution double-sided reading processing.

FIG. 6 is a timing chart depicting the high-resolution double-sided reading processing.

FIGS. 7A and 7B depict a flow chart depicting a high-velocity double-sided reading processing.

FIG. 8 is a timing chart depicting the high-velocity double-sided reading processing.

DESCRIPTION OF THE PREFERRED EMBODIMENTS

A multi-function peripheral 1 according to an embodiment of the present teaching will be explained, with reference to FIGS. 1 to 8. The multi-function peripheral 1 is an example of the image reading apparatus, and has a plurality of functions such as a copying function, a scanning function, etc. Note that in the following explanation, the right side on the sheet surface of FIG. 2 is the front side of the multi-function peripheral 1, the far side through the sheet surface of FIG. 2 is the right side of the multi-function peripheral 1, and the upper side on the sheet surface of FIG. 2 is the upper side of the multi-function peripheral 1.

<Electric Configuration of the Multi-Function Peripheral>

Figure 1A:
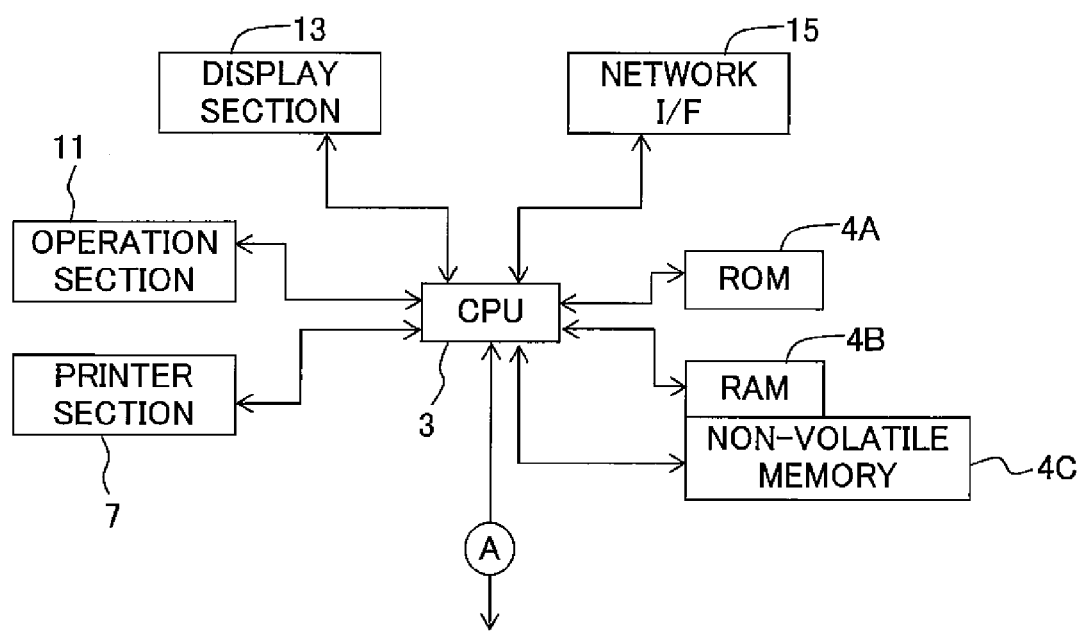
Figure 1B:
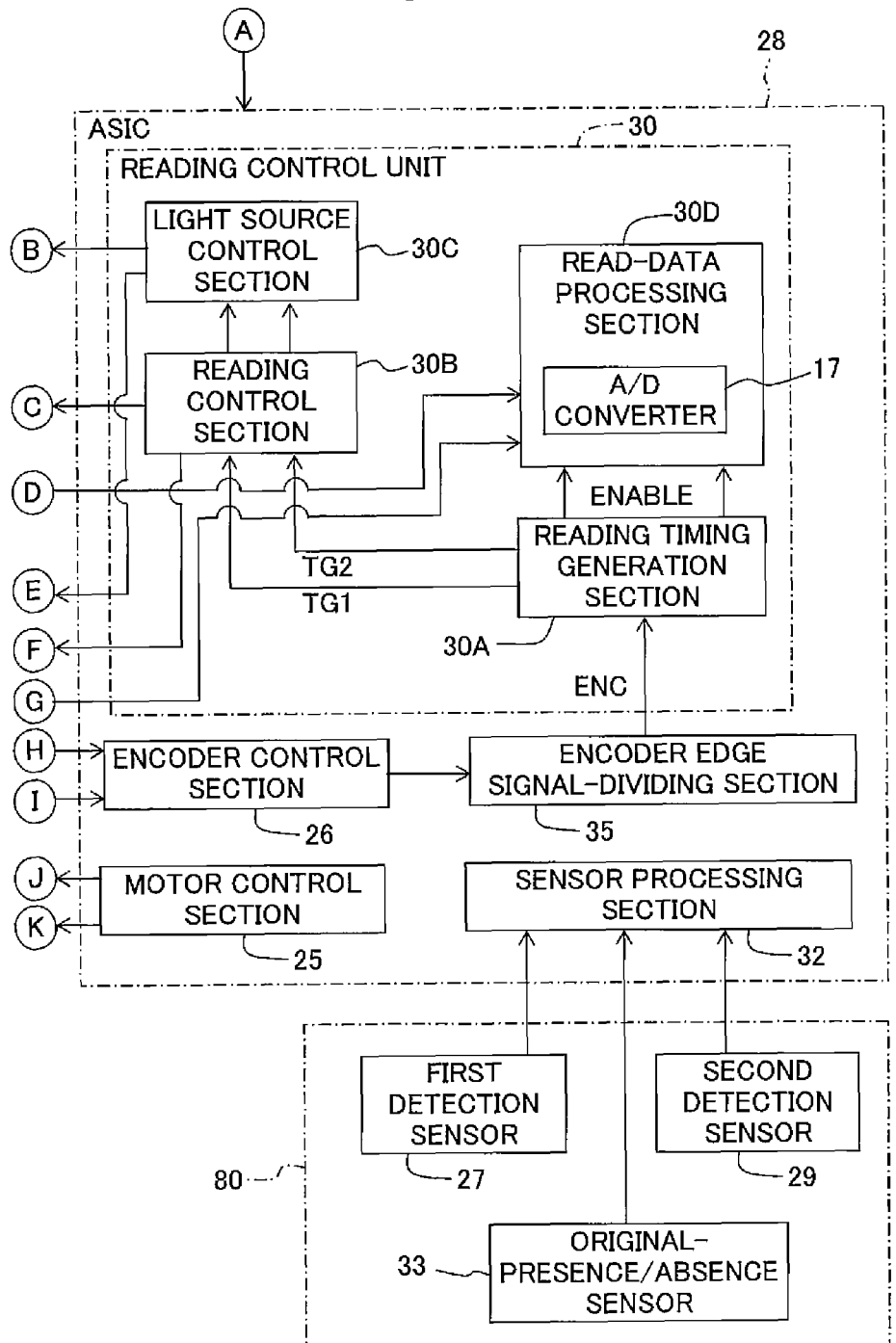

As depicted in FIGS. 1A, 1B and 1C, the multi-function peripheral 1 includes a central processing unit (hereinafter referred to as "CPU") 3, a ROM 4A, a RAM 4B, a non-volatile memory 4C, a printer section 7, an operating section 11, a display section 13, a network interface 15, an A/D converter 17, a motor unit 19, a sensor unit 80, a reading unit 20 and ASIC (Application Specific Integrated Circuit) 28.

The ROM 4A stores a program for executing a reading processing (to be described later on), programs for executing a variety of kinds of operation of the multi-function peripheral 1, etc. The CPU 3 is an example of the white reference data obtaining section and the shading correction section. The CPU 3 is connected to the ROM 4A, RAM 4B, etc., and controls the respective parts or sections of the multi-function peripheral 1 according to the program(s) read from the ROM 4A.

The RAM 4B is used as a workspace when the CPU 3 executes the respective programs, and as a temporary storage area for data. The non-volatile memory 4C stores, for example, a read-data (to be described later on), etc. The non-volatile memory 4C may be a storage device such as a NVRAM (non-volatile random access memory), a flash memory, a HDD (hard disk drive), an EEPROM (electrically erasable programmable read only memory), etc., from which data is not deleted even when the electricity is turned OFF.

Note that a medium storing the variety of kinds of programs may be a CD-ROM, a hard disk device, etc., other than the ROM, etc. Further, the ROM 4A, the RAM 4B and the non-volatile memory 4C are each an example of a storage section.

The printer section 7 perform printing of a monochrome image and/or a color image each of which is based on an image data on a sheet by, for example, an electro-photographic system or an ink-jet system. The operating section 11 has a plurality of buttons and is configured to receive a variety of kinds of input operations inputted by a user via the buttons. The display section 13 has a liquid crystal display, a lamp, etc., and is configured to display a variety of kinds of setting screens, an operation state of the apparatus, etc.

The network interface 15 is connected to an external device (for example, a non-depicted personal computer, etc.) via a non-depicted network line, and is configured to realize a mutual data communication with the external device.

The motor unit 19 has a moving mechanism 31 and an auto document feeder (hereinafter referred to as "ADF") 34 configured to convey an original automatically. The motor unit 19 is electrically connected to the ASIC 28. The moving mechanism 31 has a stepping motor SM and a stepping motor driver 31A. Note that the moving mechanism 31 is an example of the driving section.

The stepping motor SM is driven by the stepping motor driver 31A based on an instruction from the ASIC 28. The stepping motor SM can cause a front surface reading device 21 (to be described later on) to reciprocate in a sub-scanning direction that is the left and right direction on the sheet surface of FIG. 2.

For example, in a case that a clock signal is inputted to the stepping motor driver 31A from the ASIC 28, the stepping motor driver 31A updates an instruction signal for phase-excitation, per one pulse of the clock signal, and supplies the electric current to the coil based on the instruction signal so as to rotate the stepping motor SM by one step (at a predetermined angle) at a time. Further, when the input timing at which the clock signal is inputted to the stepping motor driver 31A from the ASIC 28 is changed, the stepping motor driver 31A is capable of changing the rotation speed of the stepping motor SM.

The ADF 34 has a DC motor DM, a DC motor driver 34A and an encoder 34B.

The DC motor DM is driven by the DC motor driver 34A based on an instruction from the ASIC 28. For example, in a case that a driving signal is inputted to the DC motor driver 34A from the ASIC 28, the DC motor driver 34A supplies electric current to the coil based on the driving signal so as to rotate the DC motor DM. Further, when the magnitude of the driving signal from the ASIC 28 is changed, the DC motor driver 34A is capable of changing the rotation speed of the DC motor DM.

The encoder 34B outputs a pulse signal (encoder signal) E in accordance with the rotation amount of the DC motor DM.

The sensor unit 80 has a first detection sensor 27, a second detection sensor 29 and an original-presence/absence sensor 33, and is electrically connected to the ASIC 28.

The first detection sensor 27 detects an original M approaching to a reading position for a back surface reading device 23 (to be described later on), and sends a result of detection to the ASIC 28. The second detection sensor 29 detects the original M approaching to a reading position for a front surface reading device 21 (to be described later on), and sends a result of detection to the ASIC 28. The original-presence/absence sensor 33 detects the presence/absence of the original M on an original tray 45 (to be described later on), and sends a result of detection to the ASIC 28.

The reading unit 20 has a front surface reading device 21 and a back surface reading device 23. The front surface reading device 21 has an RGB light source (light-emitting element) D1 and an image sensor 22 which is an imaging element. The back surface reading device 23 has an RGB light source (light-emitting element) D2 and an image sensor 24 which is an imaging element. Each of the image sensors 22 and 24 is an example of the photoelectric conversion element in which a plurality of light-receiving chips (not depicted in the drawings) are aligned in one direction, namely, linearly in a main scanning direction that is the left/right direction of the multi-function peripheral 1. In the following description, "one line" means the plurality of light-receiving chips aligned in the main scanning direction. In each of the light-receiving chips, a plurality of lenses (not depicted) and a plurality of light-receiving elements (not depicted) are arranged in the main scanning direction. Note that the front surface reading device 21 is an example of the second reading unit, and the back surface reading device 23 is an example of the first reading unit.

Each of the light-receiving chips has a non-depicted shift gate and a non-depicted shift resistor. The electric charge accumulated in each of the image sensors 22, 24 is transferred (transmitted) to the shift resistor via the shift gate, and is outputted while being moved successively with the shift resistor. Each of the image sensors 22 and 24 outputs the electric charge of one line successively in this manner.

The opening of the shift gate (transmittance of the electric charge) is executed in response to the application of the shift pulse. Here, each of the image sensors 22, 24 always accumulates the electric charge depending on the light receiving amount, and thus the transmittance timing at which the electric charge is transmitted to the shift resistor is a starting timing at which the accumulation of next electric charge based on the emittance of a light of next color is started. Further, the electric charge transmitted to the shift resistor is sent to the ASIC 28.

The ASIC 28 has a motor control section 25, an encoder control section 26, a reading control unit 30 and sensor processing section 32. Note that the motor control section 25 is an example of the velocity control section, and the encoder control section 26 is an example of the displacement signal outputting section.

The motor control section 25 controls the motor unit 19. Specifically, the motor control section 25 transmits the clock signal to the stepping motor driver 31A of the motor unit 19 so as to control the rotation of the stepping motor SM via the stepping motor driver 31A. Further, the motor control section 25 transmits the driving signal to the DC motor driver 34A of the motor unit 19 so as to control the rotation of the DC motor DM via the DC motor driver 34A. Thus, the motor control section 25 is also capable of executing control so as to maintain the velocity of the stepping motor SM and the velocity of the DC motor DM constantly at a target velocity.

The encoder control section 26 receives a pulse signal according to the rotation amount of the DC motor DM outputted from the encoder 34B of the motor unit 19. The encoder control section 26 transmits the encoder signal E to an encoder edge signal-dividing section 35. The encoder edge signal-dividing section 35 divides the frequency of the received encoder signal E and transmits a divided encoder signal E (hereinafter referred to as "divided pulse signal ENC") to the reading control unit 30. Note that the encoder signal E is an example of the displacement signal.

The reading control unit 30 has a reading timing generation section 30A, a reading control section 30B, a light source control section 30C and a read-data processing section 30D.

The reading timing generation section 30A receives the divided pulse signal ENC from the encoder edge signal-dividing section 35 and generates image reading timing signals TG1 and TG2 for reading (obtaining) the image of the original M. The generated image reading timing signals TG1 and TG2 are transmitted to the reading control section 30B and the light source control section 30C. Further, as will be described later on, the reading timing generation section 30A outputs an ENABLE signal in a case that a first valid data-judging section 73 judges that a signal received from a first selecting section 69 is a reading timing signal TGE. Furthermore, the reading timing generation section 30A outputs an ENABLE signal in a case that a second valid data-judging section 75 judges that a signal received from a second selecting section 71 is the reading timing signal TGE (see also FIG. 4).

The reading control section 30B controls the image sensor 22 of the front surface reading device 21 based on the image reading timing signal TG1 received from the reading timing generation section 30A, as will be described later on. Further, the reading control section 30B controls the image sensor 24 of the back surface reading device 23 based on the image reading timing signal TG2 received from the reading timing generation section 30A, as will be described later on. Furthermore, the reading control section 30B transmits the received image reading timing signals TG1 and TG2 to the light source control section 30C.

The light source control section 30C controls the light source D1 of the front surface reading device 21 based on the received image reading timing signal TG1, as will be described later on. Further, the light source control section 30C controls the light source D2 of the back surface reading device 23 based on the received image reading timing signal TG2, as will be described later on.

The read-data processing section 30D has an A/D converter 17. The read-data processing section 30D converts a read-data of an analog signal to a digital signal with the A/D converter 17. Further, the read-data processing section 30D transmits, to the CPU 3, a signal determining whether or not a read-data as an image read from the original M (an example of the electric signal) is to be received, based on the ENABLE signal received from the reading timing generation section 30A. The sensor processing section 32 receives a variety of results of detections from the sensor unit 80.

<Specific Configuration of Multi-Function Peripheral>

As depicted in FIG. 2, the multi-function peripheral 1 has a FB (flatbed) glass surface 41 on the upper surface of the body of the multi-function peripheral 1, and an original holder cover 43 covering the FB glass surface 41 and provided to be openable/closable at the frame portion of the FB glass surface 41. An ADF glass surface 55 is provided below the original holder cover 43.

The above-described front surface reading device 21 and the moving mechanism 31 are arranged below the FB glass surface 41 and the ADF glass surface 55. On the other hand, the back surface reading device 23, the ADF 34, the first detection sensor 27, the second detection sensor 29 and the original-presence/absence sensor 33 are arranged inside the original holder cover 43.

Note that in the following explanation, the upper surface of the original M placed on the original tray 45 is regarded as the front surface of the original M (an example of the other reading surface of the original M), and the lower surface of the original M placed on the original tray 45 is regarded as the back surface of the original M (an example of one reading surface of the original).

The original holder cover 43 is provided with the original tray 45 on which the original M is placed, and an original discharge tray 47 which is arranged below the original tray 45. Further, the original-presence/absence sensor 33 is provided in the vicinity of the original tray 45. A conveyance path for conveying the original M from the original tray 45 and then reversing (turning around) the original M in a U-shaped manner so as to convey the original M up to the original discharge tray 47 is formed inside the original holder cover 43. The ADF 34 includes the DC motor DM, the DC motor driver 34A and the encoder 34B, as well as a plurality of conveyance rollers 49, and an original pressing member 53 each of which is arranged at an intermediate portion in the conveyance path.

The back surface reading device 23 is arranged on a side below a portion which is a first half portion of the conveyance path and which starts from the original tray 45 up to the reversing position where the conveyance path is reversed in the U-shaped manner. The back surface reading device 23 reads an image of the back surface of the original M conveyed from the original tray 45, and transmits a read-data based on the image of the back surface (back surface image) to the AD converter 17. The back surface reading device 23 is immovable, and a white reference member 51 for the back surface (back surface-white reference member 51) is arranged at a facing position facing the back surface reading device 23, with the conveyance path being intervened between the back surface-white reference member 51 and the back surface reading device 23. In the following, the facing position is referred to as the "back surface reading position X1". Note that the back surface reading position X1 is an example of the first reading position, and the back surface-white reference member 51 is an example of the first white reference member.

The first detection sensor 27 is arranged on the upstream in the original conveyance direction (hereinafter referred to as the "upstream side") of the reading position of the back surface reading device 23. The front surface reading device 21 is arranged on a side below a portion which is a second half portion of the conveyance path and which starts from the reversing position up to the original discharge tray 47. The front surface reading device 21 reads an image of the front surface of the original M, and transmits a read-data based on the image of the front surface (front surface image) to the AD converter 17.

The front surface reading device 21 is arranged to be movable by the moving mechanism 31 in a direction parallel to the FB glass surface 41 and the ADF glass surface 55, namely to be movable in the front/rear direction of the multi-function peripheral 1. Specifically, a white reference member 57 for the front surface (front surface-white reference member 57) is arranged on the lower surface of the ADF glass surface 55, and a portion immediately below the original pressing member 53 is a front surface reading portion during the ADF conveyance. Note that the front surface-white reference member 57 is an example of the second white reference member.

The moving mechanism 31 is capable of moving the front surface reading device 21 to positions facing the front surface-white reference member 57 (hereinafter referred to as "first reference reading position X2, second reference reading position X22"), to another position facing the front surface reading position (hereinafter referred to as "front surface reading position X3"), and to yet another position immediately below the FB glass surface 41. The second detection sensor 29 is arranged on the upstream of the original pressing member 53. Note that each of the first reference reading position X2 and the second reference reading position X22 is an example of the second reading position. The front surface reading position X3 is an example of the original-reading position.

The multi-function peripheral 1 has a FB reading function and an ADF reading function as the scanning function. The FB reading function is executed in a case that the original M on the original tray 45 is not detected by the original-presence/absence sensor 33, and the ADF reading function is executed in a case that the original M on the original tray 45 is detected by the original-presence/absence sensor 33. The FB reading function is a function for reading an image of the original M placed on the FB glass surface 41 in a stationary state. When the FB reading function is executed, the front surface reading device 21 reads an image of the lower surface of the original M in the stationary state while the front surface reading device 21 is being moved in a space immediately below the FB glass surface 41 by the moving mechanism 31 in the sub-scanning direction (direction from left to right on the sheet surface of FIG. 2).

The ADF reading function is a function for reading an image of the original M while the original M is being automatically conveyed by the ADF 34. The ADF reading function includes a single-sided reading function and double-sided reading function. The single-sided reading function is a function for reading an image of a single surface (front surface) of the original M by the front surface reading device 21, and the double-sided reading function is a function for reading images on the both surfaces of the original M by the front surface reading device 21 and the back surface reading device 23.

<Encoder Signal and Reading Timing Signal>

Figure 3:
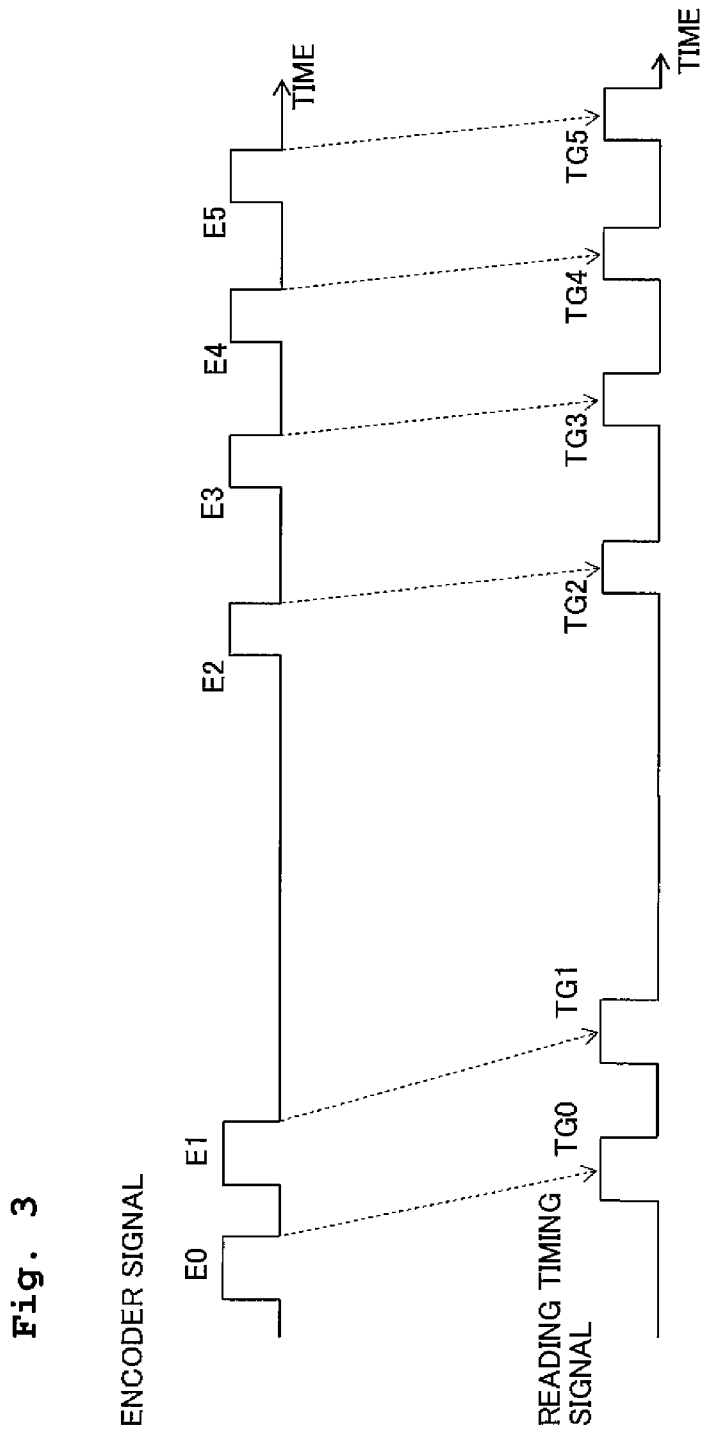
FIG. 3 is a timing chart depicting an encoder signal and an image reading timing signal.

As described above, the encoder 34B outputs the encoder signal E in accordance with the rotation amount of the DC motor DM. As depicted in FIG. 3, the reading control section 30B outputs an image reading timing signal TG, per every time period (at a time interval) required for outputting the accumulated electric charge corresponding to one line, to the image sensors 22 and 24. In this case, for example, the reading control section 30B outputs the image reading timing signal TG in synchronization with the encoder signal E.

In a case that a certain time has elapsed since the conveyance of the original M was started and the rotation speed of the DC motor DM is stable, namely, regarding encoder signals E3 to E5 depicted in FIG. 3, the encoder signal E from the encoder 34B is outputted at a relatively constant time interval. In a case that the reading control section 30B outputs the image reading timing signal TG in synchronization with the encoder signal E, the image reading timing signal TG is also outputted at a relatively constant time interval, in agreement with the encoder signal E. Namely, the time interval at which the image reading timing signal TG is outputted is stable.

On the other hand, in another case at a time immediately after the DC motor has started to drive and the rotation speed of the DC motor DM is unstable, namely, regarding encoder signals E0 to E2 depicted in FIG. 3, the encoder signal E from the encoder 34B is outputted at a non-constant time interval (is not outputted at a constant interval). In the case that the reading control section 30B outputs the image reading timing signal TG in synchronization with the encoder signal E, the image reading timing signal TG is also outputted at a non-constant time interval (is not outputted at a constant interval), in agreement with the encoder signal E. Namely, the time interval at which the image reading timing signal TG is outputted is not stable.

During a time period in which the encoder signals E0 to E2 are outputted, the encoder signal E is not outputted at the constant time interval, and thus the image reading timing signal TG is not outputted at the constant time interval. As a result, for example, any attempt to obtain a reference data for the shading correction during this time period, there arises such a problem that the value of shading correction data is not stable.

In view of such a situation, the reading timing generation section 30A has the following configuration for outputting the image reading timing signal TG at a predetermined interval and for making the value of the correction data such as the shading correction be stable even in a case that the encoder signal E from the encoder 34B is not outputted at the constant time interval.

<Configuration of Reading Timing Generation Section>

Figure 4:
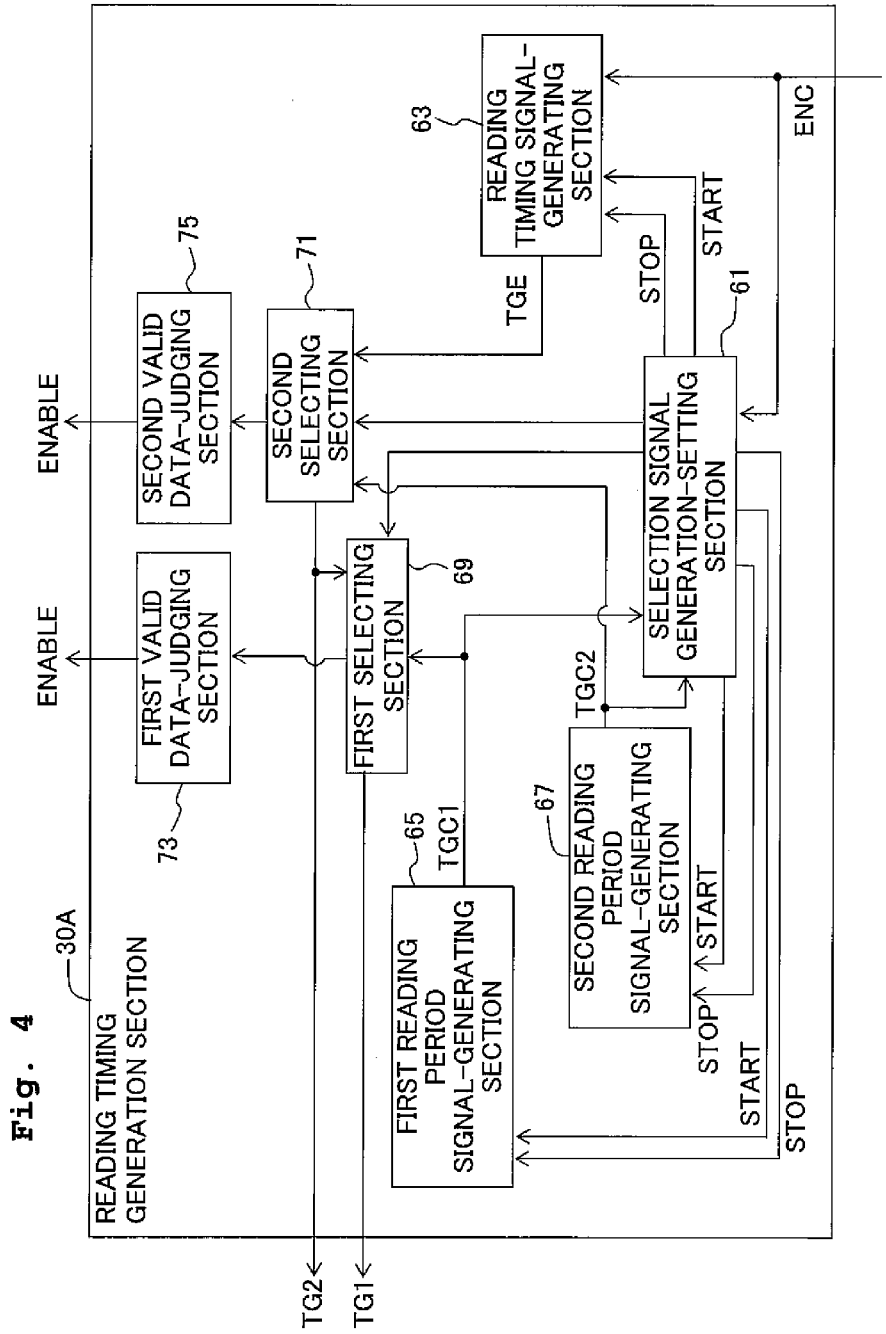
FIG. 4 is a block diagram depicting a reading timing generation section.

As depicted in FIG. 4, the reading timing generation section 30A has a selection signal generation-setting section 61, a reading timing signal-generating section 63, a first reading period signal-generating section 65, a second reading period signal-generating section 67, a first selecting section 69, a second selecting section 71, a first valid data-judging section 73 and a second valid data-judging section 75.

The selection signal generation-setting section 61 is an example of the transfer control section, and controls the reading timing signal-generating section 63, the first reading period signal-generating section 65 and the second reading period signal-generating section 67 so as to generate the respective signals. Further, the selection signal generation-setting section 61 controls the first and second selecting sections 69 and 71 so as to cause the first and second selecting sections 69 and 71 to perform signal selection.

The selection signal generation-setting section 61 transmits a start signal to the reading timing signal generating-section 63, the first reading period signal-generating section 65 and the second reading period signal-generating section 67, with reception of an instruction signal from the CPU 3 as a trigger.

In a case that the reading timing signal-generating section 63 receives the start signal from the selection signal generation-setting section 61, the reading timing signal-generating section 63 generates a reading timing signal TGE based on the divided pulse signal ENC received from the encoder edge signal-dividing section 35. Note that the reading timing signal TGE is an example of the transfer timing signal.

In a case that the first reading period signal-generating section 65 receives the start signal from the selection signal generation-setting section 61, the first reading period signal-generating section 65 generates a first reading period signal TGC1. The first reading period signal TGC1 is transmitted to the selection signal generation-setting section 61 and the first selecting section 69. Note that the first reading period signal-generating section 65 is an example of the transfer timing signal generating section, and the first reading period signal TGC1 is an example of the transfer timing signal. With this, even in a case that the rotation speed of the DC motor DM is unstable, the first reading period signal TGC1 is generated at a constant interval regardless of the encoder signal E.

In a case that the second reading period signal-generating section 67 receives the start signal from the selection signal generation-setting section 61, the second reading period signal-generating section 67 generates a second reading period signal TGC2. The second reading period signal TGC2 is transmitted to the selection signal generation-setting section 61 and the second selecting section 71. Note that the second reading period signal-generating section 67 is an example of the transfer timing signal generating section, and the second reading period signal TGC2 is an example of the transfer timing signal. With this, even in a case that the rotation speed of the DC motor DM is unstable, the second reading period signal TGC2 is generated at a constant interval regardless of the encoder signal E.

The second selecting section 71 selects, based on an instruction from the selection signal generation-setting section 61, any one of the reading timing signal TGE generated in the reading timing signal-generating section 63, and the second reading period signal TGC2 generated by the second reading period signal-generating section 67. Further, the second selecting section 71 outputs the selected signal as the image reading timing signal TG2 and transmits the selected signal to the second valid data-judging section 75 and the first selecting section 69.

The first selecting section 69 selects, based on an instruction from the selection signal generation-setting section 61, any one of the first reading period signal TGC1 generated by the first reading period signal-generating section 65 and the selected signal selected by the second selecting section 71. Further, the first selecting section 69 outputs the selected signal as the image reading timing signal TG1 and transmits the selected signal to the first valid data-judging section 73.

Based on the interval of the divided pulse signal from the encoder edge signal-dividing section 35, the selection signal generation-setting section 61 controls each of the first selecting section 69 and the second selecting section 71 to execute the signal selection described as above.

Specifically, in a case that the selection signal generation-setting section 61 judges that the interval of the divided pulse signal from the encoder edge signal-dividing section 35 is relatively large, namely, that the rotation speed of the DC motor DM is unstable immediately after the conveyance of the original M has been started, etc., the selection signal generation-setting section 61 controls the first selecting section 69 to select the first reading period signal TGC1, and controls the second selecting section 71 to select the second reading period signal TGC2.

On the other hand, in a case that the selection signal generation-setting section 61 judges that the interval of the divided pulse signal from the encoder edge signal-dividing section 35 is relatively small, namely, that the rotation speed of the DC motor DM is stable during the reading of the image of the original M, etc., the selection signal generation-setting section 61 controls the first selecting section 69 to select the reading timing signal TGE, and controls the second selecting section 71 to select the reading timing signal TGE.

By doing so, in a case that the rotation speed of the DC motor DM is stable during the reading of the image of the original M, etc., the reading timing generation section 30A generates the reading timing signal TGE in synchronization with the encoder signal E. On the other hand, in a case that the rotation speed of the DC motor DM is unstable immediately after the conveyance of the original M has been just started when obtaining the white reference data, etc., the reading timing generation section 30A generates the first reading period signal TGC1 or the second reading period signal TGC2 at a constant interval (an example of the non-synchronized interval), regardless of the encoder signal E. With this, the CPU 3 can obtain the shading correction data without being affected by the variation in the conveyance velocity of the original M.

In a case that the first valid data-judging section 73 judges that the signal received from the first selecting section 69 is the first reading period signal TGC1, the first valid data-judging section 73 outputs a DISABLE signal; whereas in a case that the first valid data-judging section 73 judges that the signal received from the first selecting section 69 is the reading timing signal TGE, the first valid data-judging section 73 outputs an ENABLE signal.

In a case that the second valid data-judging section 75 judges that the signal received from the second selecting section 71 is the second reading period signal TGC2, the second valid data-judging section 75 outputs the DISABLE signal; whereas in a case that the second valid data-judging section 75 judges that the signal received from the second selecting section 71 is the reading timing signal TGE, the second valid data-judging section 75 outputs the ENABLE signal.

<High-Resolution Double-Sided Reading Processing>

Figure 5A:
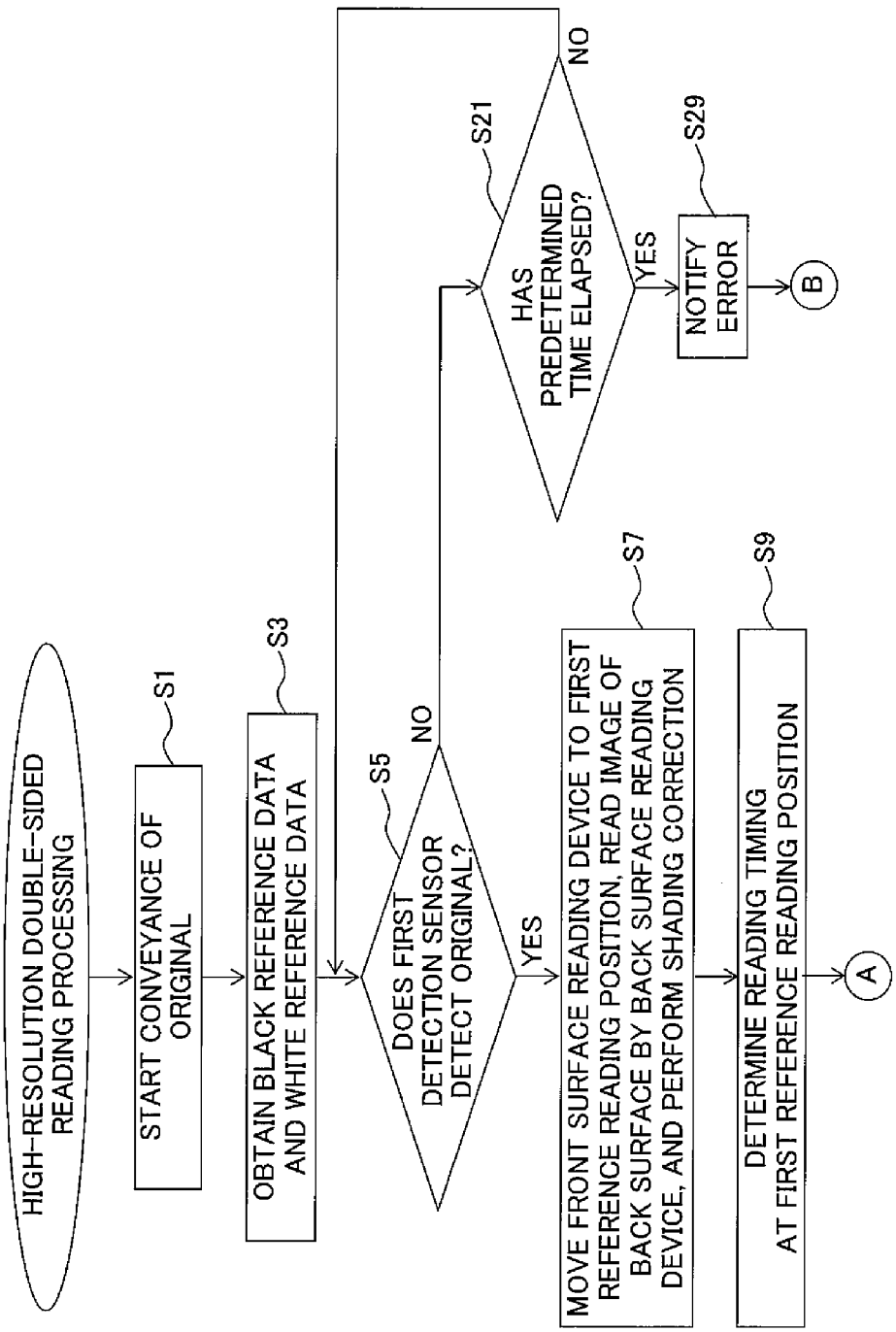

In a case that a user performs, via the operating section 11 or an input section of an external apparatus, an operation for instructing to execute high-resolution double-sided reading processing, the CPU 3 executes the high-resolution double-sided reading processing as depicted in FIGS. 5A and 5B. Note that immediately after the start of the double-sided reading processing, the front surface reading device 21 stands by at a stand-by position X4 (see FIG. 2) that is the boundary between the FB glass surface 41 and the ADF glass surface 55.

At first, the CPU 3 activates the ADF 34 so as to start the conveyance of the original M (S1). As depicted in FIG. 6, the CPU 3 executes a preparation processing for reading the back surface of the original M within a time period T1 until a forward end portion of the original M is moved from the original tray 45 to a detection area of the first detection sensor 27. This preparation processing mainly includes an obtaining processing for obtaining black reference data and white reference data for the shading correction.

The term "shading correction" described herein means a processing for correcting any reading error generated due to any unevenness (variation) in the sensitivity among the respective light-receiving elements possessed by the front surface reading device 21 and the back surface reading device 23, any unevenness in the incoming light amount due to the difference in position among the respective light-receiving elements, any unevenness in the brightness of the light sources, etc. The shading correction is generally executed by using the following formula. Note that in this case, an electric signal (read-data) corresponding to the light receiving amount of each of the light-receiving elements is expressed by 256 gradation from 0 (zero: black) to 255 (white).

$$\text{Corrected read-data} = [(\text{read-data before correction} - \text{black reference data})/(\text{white reference data} - \text{black reference data})] \times 255 \quad [\text{Formula 1}]$$

The white reference data of each of RGB is, for example, obtained by receiving pixel array data from the image sensors 22 and 24 in a state that each of the light-emitting elements of RGB is switched ON to emit light. On the other hand, the black reference data is, for example, obtained by receiving read data from the image sensors 22 and 24 in a state that each of the light-emitting elements of RGB is switched OFF.

Further, the CPU 3 transmits an instruction signal to the ASIC 28, in agreement with the start of conveyance of the original M, so as to cause the selection signal generation-setting section 61 to transmit the start signal. With this, the selection signal generation-setting section 61 controls the first reading period signal-generating section 65 to generate the first reading period signal TGC1, and controls the second reading period signal-generating section 67 to generate the second reading period signal TGC2.

Further, immediately after the start of conveyance of the original M, the rotation speed of the DC motor DM is not stable, and thus the encoder signal E is not outputted from the encoder 34B at a constant time interval. In this case, if the image reading timing signal TG is outputted while being synchronized with the encoder signal E, the time interval of the image reading timing signal TG is not stable. As a result, a problem that the value of the shading correction data is not stable is occurred. In view of such a problem, the selection signal generation-setting section 61 controls the second selecting section 71 to select the second reading period signal TGC2. With this, while the CPU 3 is executing the processing of S1, the second reading period signal TGC2 is outputted as the image reading timing signal TG2. Based on the second reading period signal TGC2, the reading control section 30B controls the image sensor 24 of the back surface reading device 23 and the light source control section 30C controls the light source D2 of the back surface reading device 23.

Further, the selection signal generation-setting section 61 controls the first selecting section 69 to select the first reading period signal TGC1. With this, while the CPU 3 is executing the processing of S1, the first reading period signal TGC1 is outputted as the image reading timing signal TG1. Based on the first reading period signal TGC1, the reading control section 30B controls the image sensor 22 of the front surface reading device 21 and the light source control section 30C controls the light source D1 of the front surface reading device 21.

Furthermore, the period of the first reading period signal TGC1 is different from the period of the second reading period signal TGC2. Accordingly, in a case that the CPU 3 obtains the white reference data immediately after the start of conveyance of the original M, the CPU 3 is capable of obtaining the read-data from the back surface reading device 23 and the front surface reading device 21 at different reading timings. In this case, the selection signal generation-setting section 61 controls the generation of the reading period signal TGC so that the read-data obtained by the back surface reading device 23 is transmitted first and then the read-data obtained by the front surface reading device 21 is transmitted next.

The CPU 3 obtains the black reference data at first and then obtains the white reference data by the back surface reading device 23 (S3). At this time, the CPU 3 functions as the white reference data-obtaining section. Further, at this time, a certain time has elapsed since the conveyance of the original M was started and the rotation speed of the DC motor DM is stable, and thus the selection signal generation-setting section 61 controls the second selecting section 71 to select the reading timing signal TGE.

With this, after the CPU 3 has executed the processing of S3, the reading timing signal TGE is outputted as the image reading timing signal TG2. Based on the reading timing signal TGE, the reading control section 30B controls the image sensor 24 of the back surface reading device 23 and the light source control section 30C controls the light source D2 of the back surface reading device 23.

In a case that the CPU 3 judges that the forward end portion of the original M is not detected by the first detection sensor 27 even after a predetermined time has elapsed (S5: NO and S21: YES), then the CPU 3 notifies the user of an error via, for example, the display section 13 (S29), and ends the high-resolution double-sided reading processing.

On the other hand, in a case that the CPU 3 judges that the forward end portion of the original M is detected by the first detection sensor 27 before the predetermined time has elapsed (S5: YES and S21: NO), then, the CPU 3 executes the processing for reading the back surface and a preparation processing for reading the front surface within a time period T2 until the forward end portion of the original M is detected by the second detection sensor 29, as depicted in FIG. 6.

Specifically, in a case that the CPU 3 judges that the forward end portion of the original M is detected by the first detection sensor 27 (S5: YES), the CPU 3 controls the moving mechanism 31 to move the front surface reading device 21 from the stand-by position X4 to the first reference reading position X2 (S7). Further, CPU 3 controls the back surface reading device 23 to read the image of the back surface of the original M which is passing through the back surface reading position X1. Further, the CPU 3 executes the shading correction for the read-data based on the shading correction data (S7). At this time, the CPU 3 functions as the shading correction section.

Next, the CPU 3 determines the reading timing at which the white reference data is read at the first reference position X2 (hereinafter referred to as a "first reference reading timing TM2") (S9).

The CPU 3 judges whether or not the first reference reading timing TM2 has arrived (S11). In a case that the CPU 3 judges that the first reference reading timing TM3 has not arrived (S11: NO), the CPU 3 stands by until the first reference reading timing TM2 arrives; in a case that the CPU 3 judges that the first reference reading timing TM2 has arrived (S11: YES), the CPU 3 obtains the black reference data and the white reference data at the first reference reading position X2 via the front surface reading device 21 (S13). At this time, the CPU 3 functions as the white reference data obtaining section. Further, the CPU 3 controls the moving mechanism 31 to move the front surface reading device 21 from the first reference reading position X2 to the front surface reading position X3 (S15).

After the CPU 3 has executed the processing of S13, the certain time has elapsed since the conveyance of the original M was started and the rotation speed of the DC motor DM is stable, and thus the time interval of the encoder signal E is stable. Therefore, even in a case that the image reading timing signal TG is outputted while being synchronized with the encoder signal E, the time interval of the image reading timing signal TG is stable. Accordingly, the selection signal generation-setting section 61 controls the first selecting section 69 to select the reading timing signal TGE.

With this, after the CPU 3 has executed the processing of S13, the reading timing signal TGE is outputted as the image reading timing signal TG1. Based on the reading timing signal TGE, the reading control section 30B controls the image sensor 22 of the front surface reading device 21 and the light source control section 30C controls the light source D1 of the front surface reading device 21.

Accordingly, the image sensor 22 is capable of transmitting the image data also in the front surface reading device 21 based on the reading timing signal TGE that is same as that in the back surface reading device 23.

Next, the CPU 3 judges whether or not the forward end portion of the original M is detected by the second detection sensor 29 (S17). In a case that the CPU 3 judges that the forward end portion of the original M is not detected by the second detection sensor 29 (S17: NO), the CPU 3 stand by until the forward end portion of the original M is detected by the second detection sensor 29. In a case that the CPU 3 judges that the forward end portion of the original M is detected by the second detection sensor 29 (S17: YES), the CPU 3 controls the front surface reading device 21 to read the image of the front surface of the original M which is passing through the front surface reading position X3 (S19). Further, the CPU 3 executes the shading correction for the read-data based on the shading correction data (S19). At this time, the CPU 3 functions as the shading correction section. After that, the CPU 3 ends the high-resolution double-sided reading processing.

<High-Velocity Double-Sided Reading Processing>

Figure 7B:
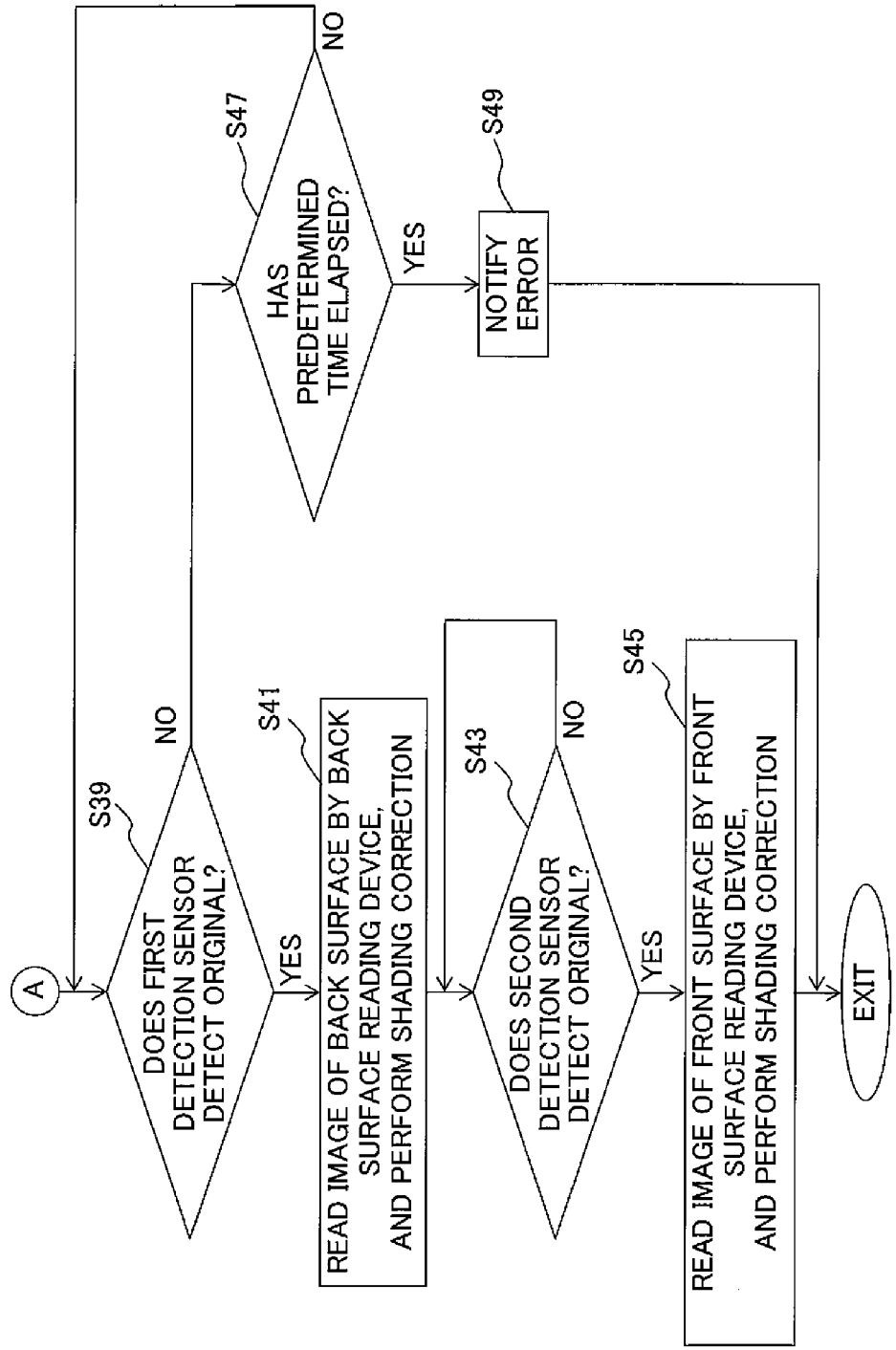

In a case that a user performs, via the operating section 11 or the input section of the external apparatus, an operation for instructing to execute high-velocity double-sided reading processing, the CPU 3 executes the high-velocity double-sided reading processing as depicted in FIGS. 7A and 7B. Note that immediately after the start of the double-sided reading processing, the front surface reading device 21 stands by at the stand-by position X4 that is the boundary between the FB glass surface 41 and the ADF glass surface 55.

At first, the CPU 3 activates the ADF 34 to start the conveyance of the original M (S31). As depicted in FIG. 8, the CPU 3 executes a preparation processing for reading the back surface of the original M within a time period T3 until a forward end portion of the original M is moved from the original tray 45 to the detection area of the first detection sensor 27. This preparation processing mainly includes an obtaining processing for obtaining black reference data and white reference data for the shading correction and a processing for moving the front surface reading device 21 by the moving mechanism 31.

The CPU 3 controls the moving mechanism 31 to move the front surface reading device 21 from the stand-by position X4 to the first reference reading position X2 (S33).

Further, the CPU 3 transmits an instruction signal to the ASIC 28, in agreement with the start of conveyance of the original M, so as to cause the selection signal generation-setting section 61 to transmit the start signal. With this, the selection signal generation-setting section 61 controls the first reading period signal-generating section 65 to generate the first reading period signal TGC1, and controls the second reading period signal-generating section 67 to generate the second reading period signal TGC2.

Note that immediately after the start of conveyance of the original M, the rotation speed of the DC motor DM is not stable, and thus the encoder signal E is not outputted from the encoder 34B at a constant time interval. In this case, if the image reading timing signal TG is outputted while being synchronized with the encoder signal E, the time interval of the image reading timing signal TG is not stable. As a result, a problem that the value of the shading correction data is not stable is occurred. In view of such a problem, the selection signal generation-setting section 61 controls the first selecting section 69 to select the first reading period signal TGC1 and controls the second selecting section 71 to select the second reading period signal TGC2.

Next, after the CPU 3 has obtained the black reference data by the back surface reading device 23, the CPU 3 obtains the white reference data (S35). Then, the CPU 3 controls the moving mechanism 31 to move the front surface reading device 21 from the first reference reading position X2 to the front surface reading position X3 (S37).

When the front surface reading device 21 is moved to the front surface reading position X3, the certain time has elapsed since the conveyance of the original M was started and the rotation speed of the DC motor DM is stable, and thus the time interval of the encoder signal E is stable. Therefore, even in a case that the image reading timing signal TG is outputted while being synchronized with the encoder signal E, the time interval of the image reading timing signal TG is stable. Accordingly, the selection signal generation-setting section 61 controls the first selecting section 69 to select the reading timing signal TGE and controls the second selecting section 71 to select the reading timing signal TGE.

With this, after the CPU 3 has executed the processing of S35, same reading timing signals TGE are outputted as the image reading timing signal TG1 and the image reading timing signal TG2. Based on the reading timing signals TGE, the reading control section 30B controls the image sensor 22 of the front surface reading device 21 and the image sensor 24 of the back surface reading device 23 and the light source control section 30C controls the light source D1 of the front surface reading device 21 and the light source D2 of the back surface reading device 23.

Accordingly, the image sensors 22 and 24 are each capable of transmitting the image data also in the front surface reading device 21 based on the reading timing TGE that is same as that in the back surface reading device 23.

In a case that the CPU 3 judges that the forward end portion of the original M is not detected by the first detection sensor 27 even after a predetermined time has elapsed (S39: NO and S47: YES), then the CPU 3 notifies the user of an error via, for example, the display section 13, etc. (S49), and ends the high-velocity double-sided reading processing.

On the other hand, in a case that the CPU 3 judges that the forward end portion of the original M is detected by the first detection sensor 27 before the predetermined time has elapsed (S39: YES), the CPU 3 controls the back surface reading device 23 to read the image of the back surface of the original M which is passing through the back surface reading position X1 (S41). Further, the CPU 3 executes the shading correction for the read-data based on the shading correction data (S41). At this time, the CPU 3 functions as the shading correction section.

Next, the CPU 3 judges whether or not the forward end portion of the original M is detected by the second detection sensor 29 (S43). In a case that the CPU 3 judges that the forward end portion of the original M is not detected by the second detection sensor 29 (S43: NO), the CPU 3 stands by until the forward end portion of the original M is detected by the second detection sensor 29. In a case that the CPU 3 judges that the forward end portion of the original M is detected by the second detection sensor 29 (S43: YES), the CPU 3 controls the front surface reading device 21 to read the image of the front surface of the original M which is passing through the front surface reading position X3 (S45). Further, the CPU 3 executes the shading correction for the read-data based on the shading correction data (S45). At this time, the CPU 3 functions as the shading correction section. After that, the CPU 3 ends the high-velocity double-sided reading processing.

Effect of the Embodiment

According to the embodiment, in cases that the rotation speed of the DC motor DM is stable during the reading of the image of the original M, etc., the reading timing signal TGE is generated while being synchronized with the encoder signal E. On the other hand, in a case that the rotation speed of the DC motor DM is not stable immediately after the conveyance of the original M has been started when obtaining the white reference data, etc., the first reading period signal TGC1 or the second reading period signal TGC 2 is generated at the constant interval, regardless of the time interval of the encoder signal E. As a result, the CPU 3 can obtain the shading correction data without being affected by any fluctuation in the conveyance velocity of original M.

Other Embodiments

The technique disclosed in the present specification is not limited to the embodiment described above and explained with reference to the drawings, and may include, for example, a variety of kinds of aspects as follows.

In the embodiment, the multi-function peripheral 1 is provided with one CPU and one memory. The multi-function peripheral 1, however, is not limited to this configuration, and may be configured to include a plurality of CPUs, may be configured to include a hardware circuit such as an ASIC, and may be configured to include both of the hardware circuit and the CPU; and the like.

The original M is not limited to paper (paper sheet) or an OHP sheet, and may be a medium such as cloth, film, etc.

In the embodiment described above, the ASIC 28 is provided with the reading control unit 30, the encoder control section 26, the encoder edge signal-dividing section 35, the motor control section 25 and the sensor processing section 32. The embodiment, however, is not limited to this configuration, and may be configured such that the CPU 3 directly controls all of, or any one of, or any combination of two or more of the reading control unit 30, the encoder control section 26, the encoder edge signal-dividing section 35, the motor control section 25 and the sensor processing section 32.

In the above-described embodiment, the CPU 3 transmits the instruction signal to the ASIC 28 in agreement with the start of conveyance of the original M to cause the selection signal generation-setting section 61 to transmit the start signal. The CPU 3, however, is not limited to this configuration, and the CPU 3 may transmit the instruction signal to the ASIC 28 after obtaining the white reference data to cause the selection signal generation-setting section 61 to transmit the start signal.

What is claimed is:
1. An image reading apparatus comprising:
a reading unit having a plurality of photoelectric conversion elements arranged in a main scanning direction, each of the plurality of photoelectric conversion elements being configured to generate an electric signal in response to receiving light from an reading object;
a white reference plate arranged to face the reading unit;
a motor configured to move at least one of an original and the reading unit relative to each other; and
a controller configured to:
control the reading unit to read the white reference plate to obtain white reference data;
determine, based on a driving velocity of the motor, whether relative position between the original and the reading unit has changed by a predetermined distance; and
output a displacement signal in a case of determining that the relative position between the original and the reading unit has changed by the predetermined distance,
wherein in a case of reading the image of the original by the reading unit, the controller is configured to:
generate a first transfer timing signal which is synchronized with the displacement signal; and
provide the first transfer timing signal to the reading unit such that a first electric signal generated by the plurality of photoelectric conversion elements is transferred in synchronization with the first transfer timing signal and the displacement signal, and
in a case of obtaining the white reference data, the controller is configured to:
generate a second transfer timing signal which is not synchronized with the displacement signal; and
provide the second transfer timing signal to the reading unit such that a second electric signal generated by the photoelectric conversion elements is transferred in synchronization with the second transfer timing signal,
wherein in the case of reading the image of the original by the reading unit, the controller is configured to drive the motor at a constant driving velocity; and
in the case of obtaining the white reference data, the controller is configured to provide the second transfer timing to the reading unit such that the second electric signal is transferred at a constant time interval corresponding to the constant driving velocity of the motor.
2. An image reading apparatus comprising:
a reading unit having a plurality of photoelectric conversion elements arranged in a main scanning direction, each of the plurality of photoelectric conversion elements being configured to generate an electric signal in response to receiving light from an reading object;
a white reference plate arranged to face the reading unit;
a motor configured to move at least one of an original and the reading unit relative to each other; and
a controller configured to:
control the reading unit to read the white reference plate to obtain white reference data;
determine, based on a driving velocity of the motor, whether relative position between the original and the reading unit has changed by a predetermined distance; and
output a displacement signal in a case of determining that the relative position between the original and the reading unit has changed by the predetermined distance, wherein in a case of reading the image of the original by the reading unit, the controller is configured to:
  generate a first transfer timing signal which is synchronized with the displacement signal; and
  provide the first transfer timing signal to the reading unit such that a first electric signal generated by the plurality of photoelectric conversion elements is transferred in synchronization with the first transfer timing signal and the displacement signal, and
in a case of obtaining the white reference data, the controller is configured to:
  generate a second transfer timing signal which is not synchronized with the displacement signal; and
  provide the second transfer timing signal to the reading unit such that a second electric signal generated by the photoelectric conversion elements is transferred in synchronization with the second transfer timing signal,
wherein the reading unit includes:
  a first reading unit having a plurality of first photoelectric conversion elements arranged in the main scanning direction and configured to read an image on one reading surface of the original by one line at a time; and
  a second reading unit having a plurality of second photoelectric conversion elements arranged in the main scanning direction and configured to read an image on the other reading surface of the original by one line at a time, and
in the case of reading the image of the original by the reading unit, the controller is configured to provide the first transfer timing signal to the reading unit such that the first electric signal generated by the first photoelectric conversion elements and the first electric signal generated by the second photoelectric conversion elements are transferred at a same timing.

3. The image reading apparatus according to claim 2, wherein the first reading unit is arranged in a fixed manner at a first reading position,
the second reading unit is arranged to be movable relative to a second reading position,
the image reading apparatus further comprises a driving section configured to move the second reading unit relative to the second reading position,
the white reference plate comprises:
  a first white reference plate arranged to face the first reading unit; and
  a second white reference plate arranged to face the second reading unit in a case that the second reading unit is located at the second reading position, and
in the case of obtaining the white reference data before the reading unit starts to read the image of the original, the controller is configured to provide the second transfer timing signal to the reading unit such that the second electric signal generated by the first photoelectric conversion elements and the second electric signal generated by the second photoelectric conversion elements are transferred at different timings, and
after the controller has obtained the white reference data, the driving section is configured to move the second reading unit from the second reading position to an original-reading position which is different from the second reading position.

4. The image reading apparatus according to claim 3, wherein in the case of obtaining the white reference data, the controller is configured to provide the second transfer timing signal to the reading unit such that the second electric signal generated by the second photoelectric conversion elements are transferred after the second electric signal generated by the first photoelectric conversion elements has been transferred.

5. An image reading apparatus comprising:
  a reading unit having a plurality of photoelectric conversion elements arranged in a main scanning direction, each of the plurality of photoelectric conversion elements being configured to generate an electric signal in response to receiving light from an reading object;
  a white reference plate arranged to face the reading unit;
  a motor configured to move at least one of an original and the reading unit relative to each other; and
  a controller configured to:
    control the reading unit to read the white reference plate to obtain white reference data;
    determine, based on a driving velocity of the motor, whether relative position between the original and the reading unit has changed by a predetermined distance; and
    output a displacement signal in a case of determining that the relative position between the original and the reading unit has changed by the predetermined distance,
wherein in a case of reading the image of the original by the reading unit, the controller is configured to:
  generate a first transfer timing signal which is synchronized with the displacement signal; and
  provide the first transfer timing signal to the reading unit such that a first electric signal generated by the plurality of photoelectric conversion elements is transferred in synchronization with the first transfer timing signal and the displacement signal, and
in a case of obtaining the white reference data, the controller is configured to:
  generate a second transfer timing signal which is not synchronized with the displacement signal; and
  provide the second transfer timing signal to the reading unit such that a second electric signal generated by the photoelectric conversion elements is transferred in synchronization with the second transfer timing signal,
wherein the controller is configured to start generation of the first transfer timing signal after the controller has obtained the white reference data and before an original arrival-timing, at which a reading start position in the original reaches a reading position of the reading unit; and
the controller is configured to continuously generate the first transfer timing signal until the original arrival-timing.

* * * * *